us011333249B2

(12) United States Patent
Jones et al.

(10) Patent No.: US 11,333,249 B2
(45) Date of Patent: May 17, 2022

(54) PLATE BETWEEN RING ASSEMBLIES OF A RING SEAL SYSTEM

(71) Applicant: Caterpillar Inc., Deerfield, IL (US)

(72) Inventors: Benjamin Jones, Bartonville, IL (US); David Hakes, Brimfield, IL (US); Jacob Pitman, Peoria, IL (US); Thomas Ellmann, Groveland, IL (US)

(73) Assignee: Caterpillar Inc., Peoria, IL (US)

( * ) Notice: Subject to any disclaimer, the term of this patent is extended or adjusted under 35 U.S.C. 154(b) by 748 days.

(21) Appl. No.: 16/222,502

(22) Filed: Dec. 17, 2018

(65) Prior Publication Data
US 2020/0191275 A1 Jun. 18, 2020

(51) Int. Cl.
*F16J 15/3284* (2016.01)
*F16J 15/3204* (2016.01)
*F16J 15/34* (2006.01)

(52) U.S. Cl.
CPC ....... *F16J 15/3284* (2013.01); *F16J 15/3204* (2013.01); *F16J 15/344* (2013.01)

(58) Field of Classification Search
CPC ..... F16J 15/3284; F16J 15/3204; F16J 15/344
See application file for complete search history.

(56) References Cited

U.S. PATENT DOCUMENTS

| | | | | |
|---|---|---|---|---|
| 3,108,370 A | * | 10/1963 | Peickii | F16J 15/348 29/458 |
| 3,452,995 A | * | 7/1969 | Engelking | F16J 15/344 277/360 |
| 3,499,653 A | * | 3/1970 | Gardner | F16J 15/3412 277/362 |
| 4,077,634 A | * | 3/1978 | Durham | F16J 15/344 277/382 |
| 4,323,255 A | * | 4/1982 | Wiese | F16J 15/3404 277/362 |
| 4,489,952 A | | 12/1984 | Ohtsuka | |

(Continued)

FOREIGN PATENT DOCUMENTS

| | | |
|---|---|---|
| DE | 10260585 | 7/2004 |
| EP | 2655942 | 8/2017 |

OTHER PUBLICATIONS

Caterpillar, "CAT® Seals", http://s7d2.scene7.com/is/content/Caterpillar/C10383242, Jan. 27, 2015, 44 pages.

(Continued)

*Primary Examiner* — Christine M Mills
*Assistant Examiner* — L. Susmitha Koneru
(74) *Attorney, Agent, or Firm* — Harrity & Harrity LLP (57) ABSTRACT

A ring seal system is disclosed. The ring seal system may include a first ring assembly that includes a first sealing surface. The ring seal system may include a second ring assembly that includes a second sealing surface. The ring seal system may include a plate, between the first ring assembly and the second ring assembly, that includes a first contact surface and a second contact surface. The ring seal system may include a coating on the first contact surface and the second contact surface. The first contact surface may be mechanically connected to the first sealing surface to form a first seal with the first sealing surface. The second contact surface may be mechanically connected to the second sealing surface form a second seal with the second sealing surface.

20 Claims, 10 Drawing Sheets

(56) References Cited

U.S. PATENT DOCUMENTS

| | | | | |
|---|---|---|---|---|
| 4,844,483 A | * | 7/1989 | Iijima | F16J 15/162 |
| | | | | 277/382 |
| 2007/0045966 A1 | * | 3/2007 | Jiang | F16J 15/344 |
| | | | | 277/404 |
| 2008/0233303 A1 | | 9/2008 | Jiang et al. | |
| 2008/0309013 A1 | * | 12/2008 | Taheri Oskouei | F16J 15/3468 |
| | | | | 277/307 |
| 2009/0074601 A1 | * | 3/2009 | Van Dyke | F01C 19/12 |
| | | | | 418/55.4 |
| 2012/0155953 A1 | * | 6/2012 | Khare | F16J 15/344 |
| | | | | 403/161 |
| 2012/0163904 A1 | * | 6/2012 | Liang | F16J 15/344 |
| | | | | 403/161 |
| 2014/0319780 A1 | | 10/2014 | Vertenten | |
| 2015/0345642 A1 | * | 12/2015 | Haas | F16J 15/3496 |
| | | | | 427/577 |
| 2016/0369896 A1 | * | 12/2016 | Thorson | F16J 15/344 |
| 2017/0051857 A1 | * | 2/2017 | Sakakura | F16L 39/04 |
| 2017/0363234 A1 | * | 12/2017 | Britt, Jr. | F16L 23/18 |
| 2019/0002044 A1 | * | 1/2019 | Haas | C23C 28/00 |
| 2019/0186632 A1 | * | 6/2019 | Haas | F16D 3/226 |

OTHER PUBLICATIONS

Caterpillar, "CAT® Seals Designed To Handle Tough Environments", http://s7d2.scene7.com/is/content/Caterpillar/C10383241, Jan. 26, 2015, 4 pages.

Caterpillar, CAT® Precision Seals, http://s7d2.scene7.com/is/content/Caterpillar/C10348971, 2014, 2 pages.

Caterpillar, "CAT® Seals", http://s7d2.scene7.com/is/content/Caterpillar/CM20150421-35555-26171, Apr. 21, 2015, 68 pages.

* cited by examiner

PLATE BETWEEN RING ASSEMBLIES OF A RING SEAL SYSTEM

TECHNICAL FIELD

The present disclosure relates generally to a ring seal system and, more particularly, to a plate between ring assemblies of a ring seal system.

BACKGROUND

A machine may include a ring seal system that includes multiple ring assemblies. The ring assemblies are typically annular in shape and are pressed together to from a seal around components of the machine, such as to contain lubricant oil around the components, to prevent dirt or other material from interfering with operation of the components, to absorb load from the machine, and/or the like. For example, the ring assemblies may form a seal around, and/or may be used in conjunction with, rotating components of the machine, such as rollers of a machine that includes a crawler track. The ring assemblies that are used to form the seal often have metal sealing surfaces that are pressed together in association with installation on the machine to form the seal. Friction and/or heat generated between these metal faces during operation of the machine (e.g., due to rotation of the ring assemblies relative to each other) causes significant wear to the metal sealing surfaces, thereby causing failure of the seal formed by the ring assemblies, thereby causing one or more of the ring assemblies to have to be replaced, and/or the like. In addition, failure of the seal may cause lubricant oil to have to be replenished at a high frequency. Replacement of a ring assembly and/or of lubricant oil is costly and results in downtime of the machine.

One attempt to eliminate oil leakage, to reduce mechanical power loss, to avoid an increase in weight, and to shorten the replacement time for lubricant oil is disclosed in U.S. Pat. No. 4,844,483 that issued to Iijima, et al. on Jul. 4, 1989 ("the '483 patent"). In particular, the '483 patent discloses a floating seal device. The floating ring seal device includes a fixed side O-ring held by a fixed side seal retainer, a rotary side O-ring held by a rotary side seal retainer, and fixed side and rotary side seal rings pressed against each other by the respective O-rings so that their opposed surfaces may be slidably held in contact with each other. The '483 patent further discloses mounting an oil absorbing member made of felt or the like to a peripheral wall surface formed on the opposed surface of the rotary side seal ring.

While the oil absorbing member of the '483 patent may include an attempt to eliminate oil leakage, to reduce mechanical power loss, to avoid an increase in weight, and to shorten the replacement time for lubricant oil, the oil absorbing member of the '483 patent does not provide mechanical support between metal surfaces of a ring seal, does not reduce friction between the metal surfaces, does not dissipate heat generated between the metal surfaces, and/or the like.

The plate between ring assemblies of a ring seal of the present disclosure solves one or more of the problems set forth above and/or other problems in the art.

SUMMARY

According to some implementations, the present disclosure is related to a ring seal system, comprising: a first ring assembly that includes a first sealing surface; a second ring assembly that includes a second sealing surface; a plate, between the first ring assembly and the second ring assembly, that includes a first contact surface and a second contact surface, wherein the plate comprises: a metal, a ceramic, or a carbon alloy; and a coating on the first contact surface and the second contact surface, wherein the coating is to substantially prevent wear between the first contact surface and the first sealing surface and between the second contact surface and the second sealing surface, wherein the first contact surface is mechanically connected to the first sealing surface to form a first seal with the first sealing surface, and wherein the second contact surface is mechanically connected to the second sealing surface form a second seal with the second sealing surface.

According to some implementations, the present disclosure is related to a machine that includes a ring seal system, the ring seal system comprising: a plurality of ring assemblies; and a plate between the plurality of ring assemblies, comprising: a plate of material with a first contact surface and a second contact surface adjacent to an exterior edge of the plate of material, wherein the first contact surface and the second contact surface are aligned relative to each other based on an alignment of a first sealing surface of the plurality of ring assemblies, and a second sealing surface of the plurality of ring assemblies, wherein a first hardness and a first coefficient of friction of the first contact surface and the first sealing surface approximately match each other, and wherein a second hardness and a second coefficient of friction of the second contact surface and the second sealing surface approximately match each other.

According to some implementations, the present disclosure is related to a plate, comprising: a plate of material with a first contact surface and a second contact surface adjacent to an exterior edge of the plate of material; a first coating on the first contact surface to substantially prevent wear to the first contact surface or to a first sealing surface of a ring seal system based on a first hardness of the first coating; and a second coating on the second contact surface to substantially prevent wear to the second contact surface or to a second sealing surface of the ring seal system based on a second hardness of the second coating, wherein the first contact surface is to form a first seal with the first sealing surface, wherein the second contact surface is to form a second seal with the second sealing surface.

DETAILED DESCRIPTION

This disclosure relates to a plate between ring assemblies of a ring seal system. The ring seal system has universal applicability to any machine utilizing such a ring seal system. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckle-boom loader, a material handler, a motor grader, a pipelayer, a road reclaimer, a skid steer loader, a skidder, a telehandler, a tractor, a dozer, a tractor scraper, or other above ground equipment, underground equipment, or marine equipment. Moreover, one or more implements may be connected to the machine and driven from a component that includes the ring seal system.

Figure 1:
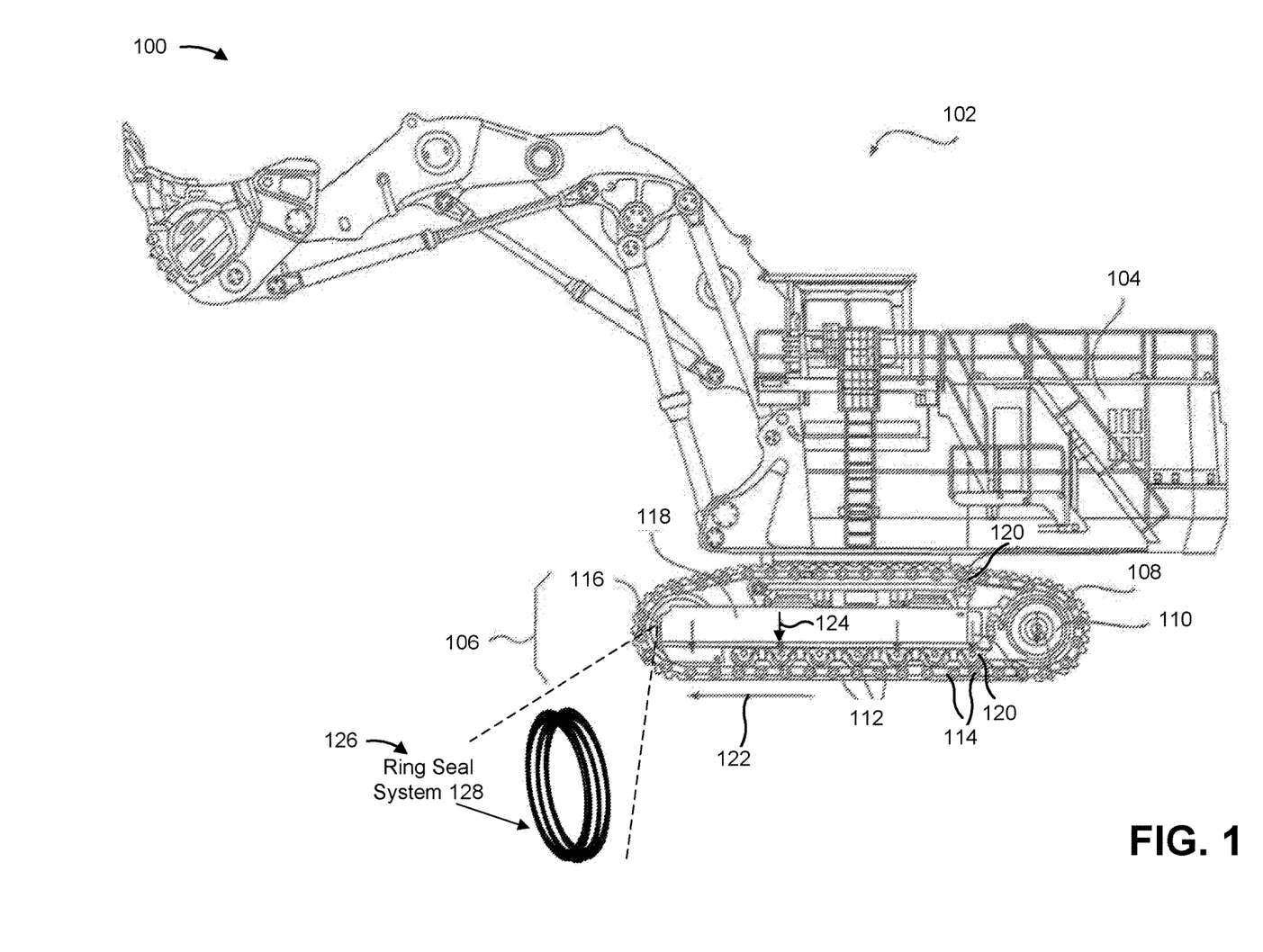
FIG. 1 is a diagram of an example machine that includes a plate between ring assemblies of a ring seal system.

FIG. 1 is a diagram 100 of an example machine that includes a plate between ring assemblies of a ring seal system.

FIG. 1 shows a track type machine 102. For example, machine 102 may be a shovel, such as a mining shovel, a hydraulic mining shovel, and/or the like. In some implementations, machine 102 may include an engine 104 supported by a frame and configured to drive a tracked undercarriage 106 (e.g., a crawler track, a continuous track, and/or the like).

In some implementations, tracked undercarriage 106 may include crawler tracks 108 that are located at opposing sides of machine 102 and driven by engine 104 via corresponding drive wheels 110. In some implementations, crawler track 108 may include a plurality of crawler shoes 112 connected end-to-end via pins 114 to form an endless loop. In some implementations, the endless loop of crawler shoes 112 may be wrapped around corresponding drive wheels 110, one or more idler wheels 116, and at least one roller 120. In some implementations, drive wheels 110 may engage pins 114 (or engage bushings that encase pins 114) of crawler shoes 112 and thereby transmit torque from engine 104 to crawler track 108. In some implementations, idler wheel 116 and rollers 120 may guide crawler track 108 in a general elliptical trajectory around drive wheels 110. In some implementations, a tensioner 118 may be located between idler wheel 116 and drive wheel 110 to push these components apart and thereby maintain a desired tension of crawler track 108. In some implementations, crawler shoes 112 may function to transmit the torque from drive wheels 110 as a driving linear (tractive) force 122 into a ground surface. The weight of machine 102 may be transmitted from drive wheel 110, idler wheel 116, and rollers 120 through crawler shoes 112 as a downward bearing force 124 into the ground surface.

As shown by reference number 126, machine 102 may include a ring seal system 128. For example, crawler track 108, drive wheel 110, idler wheel 116, roller 120, and/or the like of machine 102 may include a set of ring seal systems 128. As described elsewhere herein, ring seal system 128 may include multiple ring assemblies that form a seal around components of machine 102. For example, the seal may contain lubricating oil around rotating components of machine 102, may substantially prevent dirt or other material from interfering with operation of the rotating components, and/or the like. In addition, and as described elsewhere herein, ring seal system 128 may include a plate between the ring assemblies (e.g., between respective sealing surfaces of the ring assemblies) of ring seal system 128. As described elsewhere herein, the plate may reduce friction and/or heat generated with respect to sealing surfaces of ring seal system 128, may absorb heat generated during rotation of sealing surfaces relative to each other, may absorb load generated by a weight of machine 102, and/or the like.

As indicated above, FIG. 1 is provided as an example. Other examples are possible and may differ from what was described in connection with FIG. 1. Although FIG. 1 shows ring seal system 128 as being deployed in tracked undercarriage 106 of machine 102, ring seal system 128 may be deployed in various other types of machines and/or components for various industries. For example, ring seal system 128 may be deployed in connection with various rotating components of a final drive, a giant rock crusher, an industrial shredder, a sewer pump, dredging equipment, and so forth.

Figure 2:
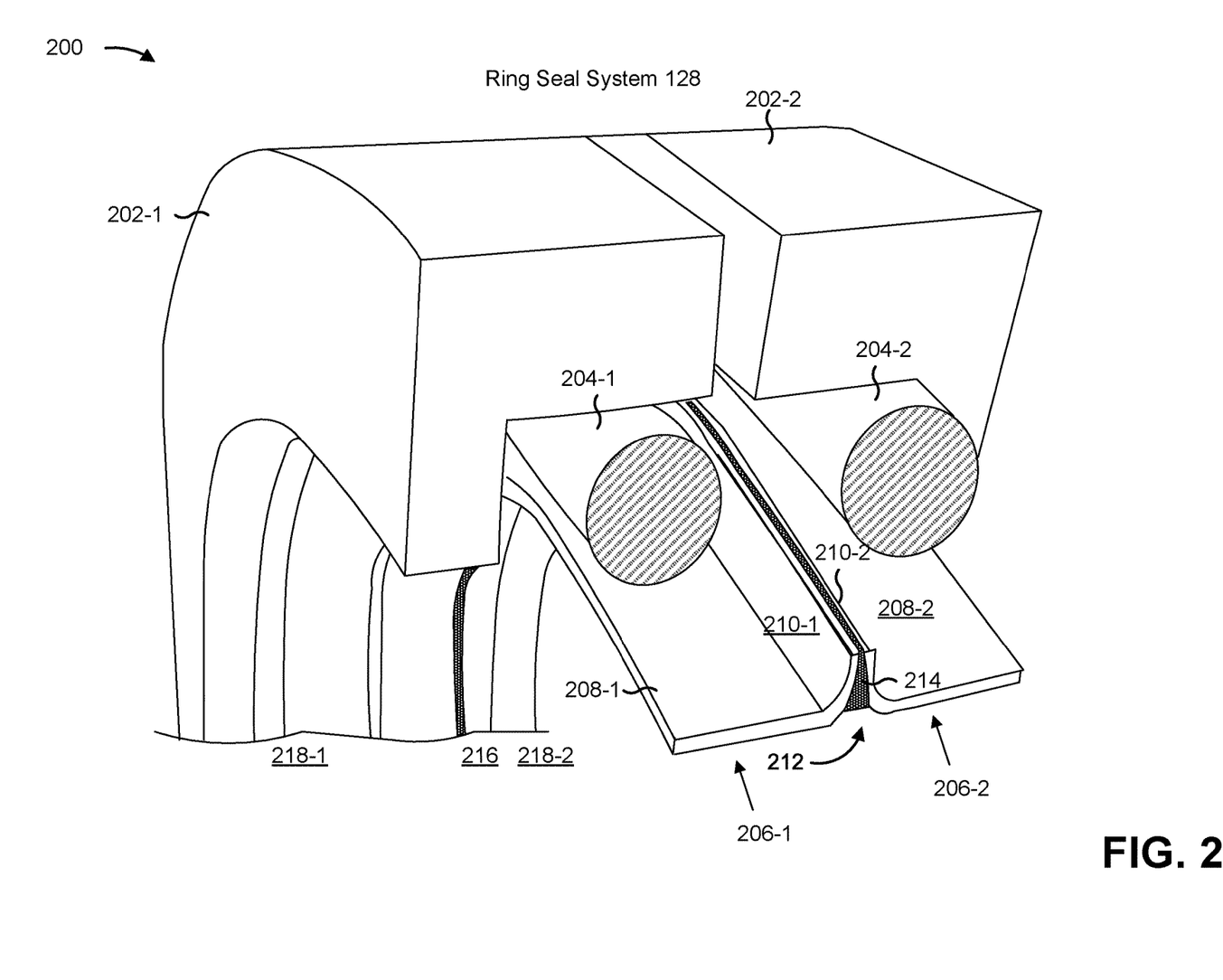
FIG. 2 is a cross-sectional perspective diagram of an example ring seal system that may be used with the machine of FIG. 1.

FIG. 2 is a cross-sectional perspective diagram 200 of an example ring seal system that may be used with the machine of FIG. 1. FIG. 2 shows a portion of ring seal system 128.

As shown, ring seal system 128 includes multiple seal ring housings 202 for ring assemblies 206 included in ring seal system 128. For example, ring seal system 128 includes seal ring housing 202-1 for ring assembly 206-1 and seal ring housing 202-2 for ring assembly 206-2. In some implementations, seal ring housing 202 may comprise metal, ceramic, a carbon alloy, and/or the like depending on use of ring seal system 128, heat and/or mechanical stresses that are expected to be applied to ring seal system 128, and/or the like. In some implementations, seal ring housing 202 may protect ring seal system 128 from damage during operation of machine 102, from dirt or other material, and/or the like.

As further shown in FIG. 2, ring seal system 128 may include multiple torics 204. For example, ring seal system 128 may include toric 204-1 for ring assembly 206-1 and toric 204-2 for ring assembly 206-2. In some implementations, toric 204 may comprise rubber, an elastomeric material, plastic, and/or the like. The material used for toric 204 may be selected to have a suitable compressibility to form a secure fluid-tight seal with adjacent components of ring seal system 128. Additionally, or alternatively, material for toric 204 may be selected to withstand heat and/or friction produced by adjacent or nearby components of ring seal system 128.

In some implementations, toric 204 may be configured to secure ring assemblies 206 within seal ring housings 202. In some implementations, torics 204 may apply mechanical constriction on ring assemblies 206 to produce a fluid-tight seal between torics 204 and seal ring housings 202 and between torics 204 and ring assemblies 206. Additionally, or alternatively, the mechanical compression applied by torics 204 may produce various fluid-tight seals at seal ring interface 212. For example, torics 204 may cause fluid-tight seals to be formed between respective sealing surfaces of ring assemblies 206 and corresponding contact surfaces of plate 214 based on torics 204 compressing the respective sealing surfaces and the corresponding contact surfaces together.

As further shown in FIG. 2, ring seal system 128 may include multiple ring assemblies 206. In some implementations, ring assembly 206 may comprise metal, a ceramic, a carbon alloy, and/or the like. In some implementations, ring assembly 206 may include a metal-faced ring assembly, a heavy duty dual faced (HDDF) seal ring, a duo-cone seal ring, and/or the like. In some implementations, ring assembly 206 may include a first section 208. For example, ring assembly 206-1 may include first section 208-1 and ring assembly 206-2 may include first section 208-2. In addition, ring assembly 206 may include a second section 210. For example, ring assembly 206-1 may include second section 210-1 and ring assembly 206-2 may include second section 210-2.

In some implementations, first section 208 and second section 210 may be oriented at an angle with respect to each other (e.g., approximately 90 degrees depending on a percentage of second sections 210-1 and 210-2 that are to contact corresponding contact surfaces of plate 214). In some implementations, second section 210-1 of ring assembly 206-1 and second section 210-2 of ring assembly 206-2 may be configured to engage plate 214 at seal ring interface 212. In some implementations, second sections 210-1 and 210-2 may include the respective sealing surfaces of ring assemblies 206 (e.g., surfaces that are to contact corresponding contact surfaces of plate 214). In some implementations, second portions 210 and/or the respective sealing surfaces may be flat or may have one of a variety of curved surface shapes. In some implementations, the specific shape of second sections 210 and/or the sealing surfaces may be selected based on a use, cost, and/or the like of ring seal system 128. In some implementations, a set of coatings, similar to that described elsewhere herein, may be disposed on respective sealing surfaces of second sections 210.

As further shown in FIG. 2, ring seal system 128 may include plate 214 at seal ring interface 212. In some implementations, plate 214 may include a plate of material that comprises ceramic, metal, a carbon alloy, and/or the like. In some implementations, plate 214 may be mechanically connected to respective sealing surfaces of second sections 210 of ring assemblies 206 to form a fluid-tight seal. In some implementations, plate 214 may be held in place between second sections 210 via fiction between respective sealing surfaces of second sections 210 and corresponding contact surfaces of plate 214. In some implementations, plate 214 may be affixed to one or both of second sections 210 depending on a use of ring seal system 128 (e.g., plate 214 may be affixed to only one of the second sections 210 when ring assemblies 206 are to rotate relative to each other). For example, plate 214 may be affixed via use of a set of fasteners, welding, an adhesive, and/or the like, such that fluid-tight seals can be formed between respective sealing surfaces of second sections 210 and corresponding contact surfaces of plate 214. In some implementations, plate 214 may be configured between ring assembly 206-1 and 206-2 in seal ring interface 212 such that second sections 210 do not contact each other.

In some implementations, plate 214 may include a coating on contact surfaces of plate 214. For example, the coating may include a high-velocity oxygen fuel (HVOF) coating, a high-velocity air fuel (HVAF) coating, an amorphous diamond-like carbon (ADLC) coating, a nitride-based coating formed from a nitriding process, and/or the like. In some implementations, the coating may provide increased hardness and/or wear resistance for plate 214. In some implementations, different contact surfaces of plate 214 may have the same coating or may have different coatings. In some implementations, plate 214 may be processed using one or more treatment processes, such as a heat treatment process, a cold treatment process, a shock hardening process, and/or the like, to cause plate 214 to have a particular hardness.

In some implementations, contact surfaces of plate 214 may have a hardness and/or a coefficient of friction that matches a hardness and/or a coefficient of friction of corresponding sealing surfaces of second sections 210 (e.g., based on material used for plate 214 and/or respective coatings on the contact surfaces). For example, a first hardness and/or coefficient of friction of a first contact surface of plate 214 may match that of a corresponding sealing surface of second section 210-1, and a second hardness and/or coefficient of friction of a second contact surface of plate 214 may match that of a corresponding sealing surface of second section 210-2. Continuing with the previous example, the matching hardnesses and/or coefficients of friction may substantially prevent wear to second sections 210 and/or plate 214 during operation of machine 102 and/or heat generation during operation of machine 102 due to relative rotation of these components (e.g., wear and/or heat that may damage second sections 210 and/or plate 214, that may cause failure of a seal formed between second sections 210 and plate 214, and/or the like). As an example, substantially preventing wear may include maintaining a width of a contact band between respective sealing surfaces of ring assemblies 206 and corresponding contact surfaces of plate 214 within 20% of an initial width of the contact band during an operating life of ring assemblies 206 (e.g., 20,000-30,000 operating hours).

In some implementations, hardnesses and/or coefficients of friction of different components may match when the hardnesses and/or coefficients of friction are within 10 percent of each other. In some implementations, contact surfaces of plate 214 and/or sealing surfaces of respective second sections 210 may have a hardness of at least 40 on a Rockwell scale. In some implementations, different contact surfaces of plate 214 may have different hardnesses and/or coefficients of friction and different respective sealing surfaces of second sections 210 may have different hardnesses and/or coefficients of friction.

In some implementations, contact surfaces of plate 214 may have a lower hardness than respective sealing surfaces of second section 210 so that plate 214 wears faster than the respective sealing surfaces. For example, depending on relative costs of plate 214 and ring assemblies 206, depending on relative eases of replacement of plate 214 and ring assemblies 206, and/or the like, having plate 214 wear faster than second sections 210 may conserve costs associated with replacing ring assemblies 206, time associated with replacing ring assembly 206, and/or the like.

In some implementations, plate 214 may have a particular shape, as described elsewhere herein. For example, plate 214 may have an annular shape, a rectangular shape, a hexagonal shape, and/or the like depending on a shape of ring assemblies 206 of ring seal system 128 in which plate 214 is to be installed, depending on a cost of producing plate 214, and/or the like. In some implementations, and as described elsewhere herein, plate 214 may have a rectangular cross-section, a triangular cross-section, a T-shaped cross-section, and/or the like. In some implementations, plate 214 may have a particular thickness. For example, plate 214 may have a thickness depending on a manner in which plate 214 is to be used, an amount of friction and/or heat plate 214 is expected to experience, an amount of mechanical stress plate 214 is expected to experience, and/or the like. For example, plate 214 may be thicker for higher relative amounts of friction and/or heat that are predicted to be generated.

As further shown in FIG. 2, plate 214 may include a set of plate bores 216 and ring assemblies 206 may include respective sets of ring bores 218. In some implementations, an interior surface of plate 214 may define the set of plate bores 216. For example, and as shown in FIG. 2, because plate 214 has an annular shape, an interior surface of plate 214 may define a single circular plate bore 216.

In some implementations, the set of plate bores 216 may match respective sets of ring bores 218 in ring assemblies 206. For example, the set of plate bores 216 may include a similar quantity, size, arrangement, and/or the like of plate bores as the respective sets of ring bores 218. In some implementations, the set of plate bores 216 may include a different quantity, size, arrangement, and/or the like of plate bores as the respective sets of ring bores 218 in ring assemblies 206.

In some implementations, the set of plate bores 216 may permit plate 214 to be placed around other components of machine 102, may form, in conjunction with respective sets of ring bores 218 of ring assemblies 206, a chamber for lubricating oil or other fluids, and/or the like. In some implementations, and as further shown in FIG. 2, the set of plate bores 216 and the respective sets of ring bores 218 may be aligned with each other. For example, the set of plate bores 216 and the respective sets of ring bores 218 may overlap in-line with each other. In some implementations, the set of plate bores 216 and the respective sets of ring bores 218 may be offset from each other.

As indicated above, FIG. 2 is provided as an example. Other examples may differ from what was described in connection with FIG. 2.

Figure 3:
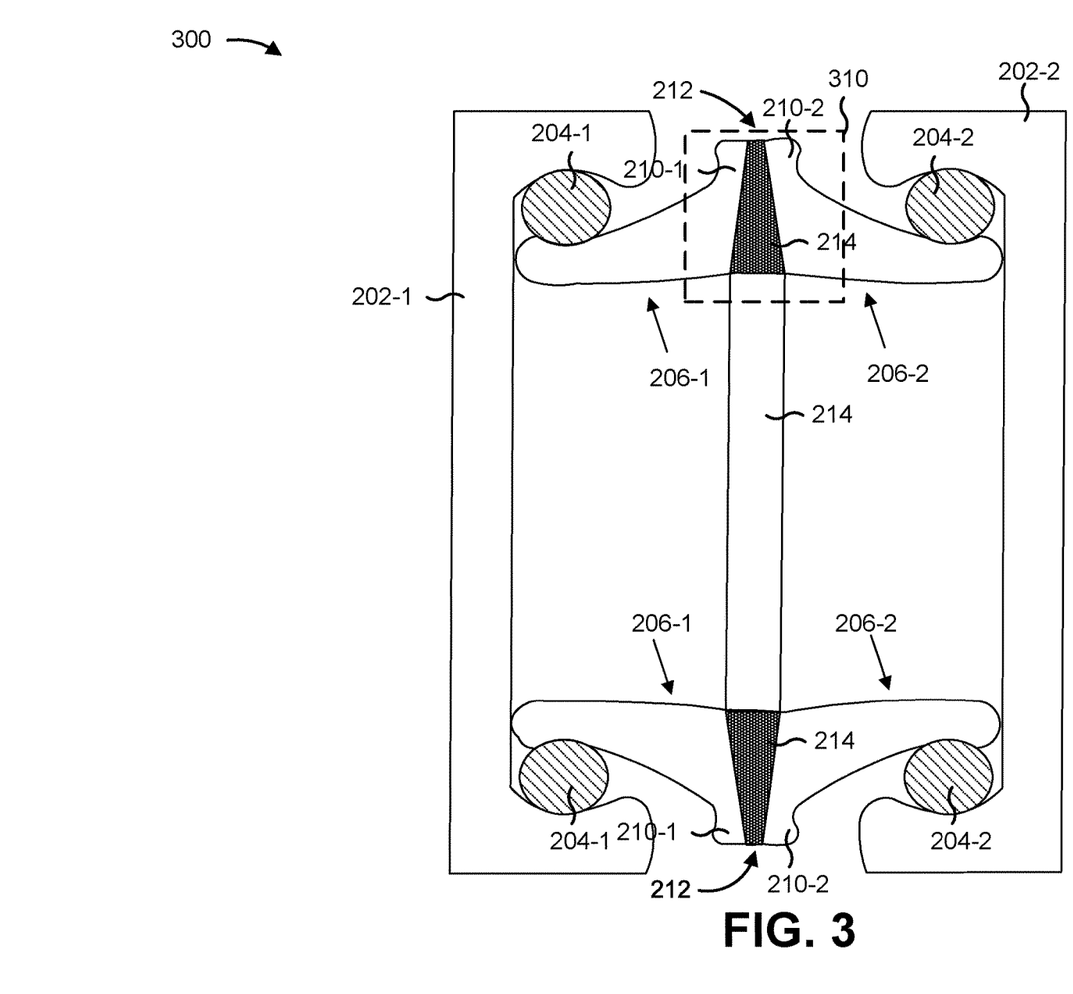
FIG. 3 is a cross-sectional diagram of an example ring seal system that may be used with the machine of FIG. 1.

FIG. 3 is a cross-sectional diagram 300 of an example ring seal system that may be used with the machine of FIG. 1.

Reference number 310 shows a cross-section of seal ring interface 212. As shown by reference number 310, plate 214 may be mechanically connected to ring assembly 206-1 and ring assembly 206-2 (e.g., to respective sealing surfaces of respective second sections 210 of ring assembly 206-1 and ring assembly 206-2). As further shown by reference number 310, plate 214 may substantially prevent ring assemblies 206 from mechanically contacting each other, such as to substantially prevent ring assemblies 206-1 and 206-2 from causing wear to respective sealing surfaces of each other. In some implementations, and as further shown by reference number 310, a shape of contact surfaces of plate 214 (e.g., surfaces that contact ring assemblies 206) may match a shape of respective sealing surfaces of ring assemblies 206 (e.g., surfaces that contact plate 214). For example, the contact surfaces may be aligned based on the shape of the respective sealing surfaces (e.g., may be configured with a particular shape that matches the shape of the respective sealing surfaces, may be pressed into a shape, by the respective sealing surfaces, that matches the shape of the respective sealing surfaces when installed in ring seal system 128, and/or the like).

As indicated above, FIG. 3 is provided as an example. Other examples may differ from what was described in connection with FIG. 3.

Figure 4:
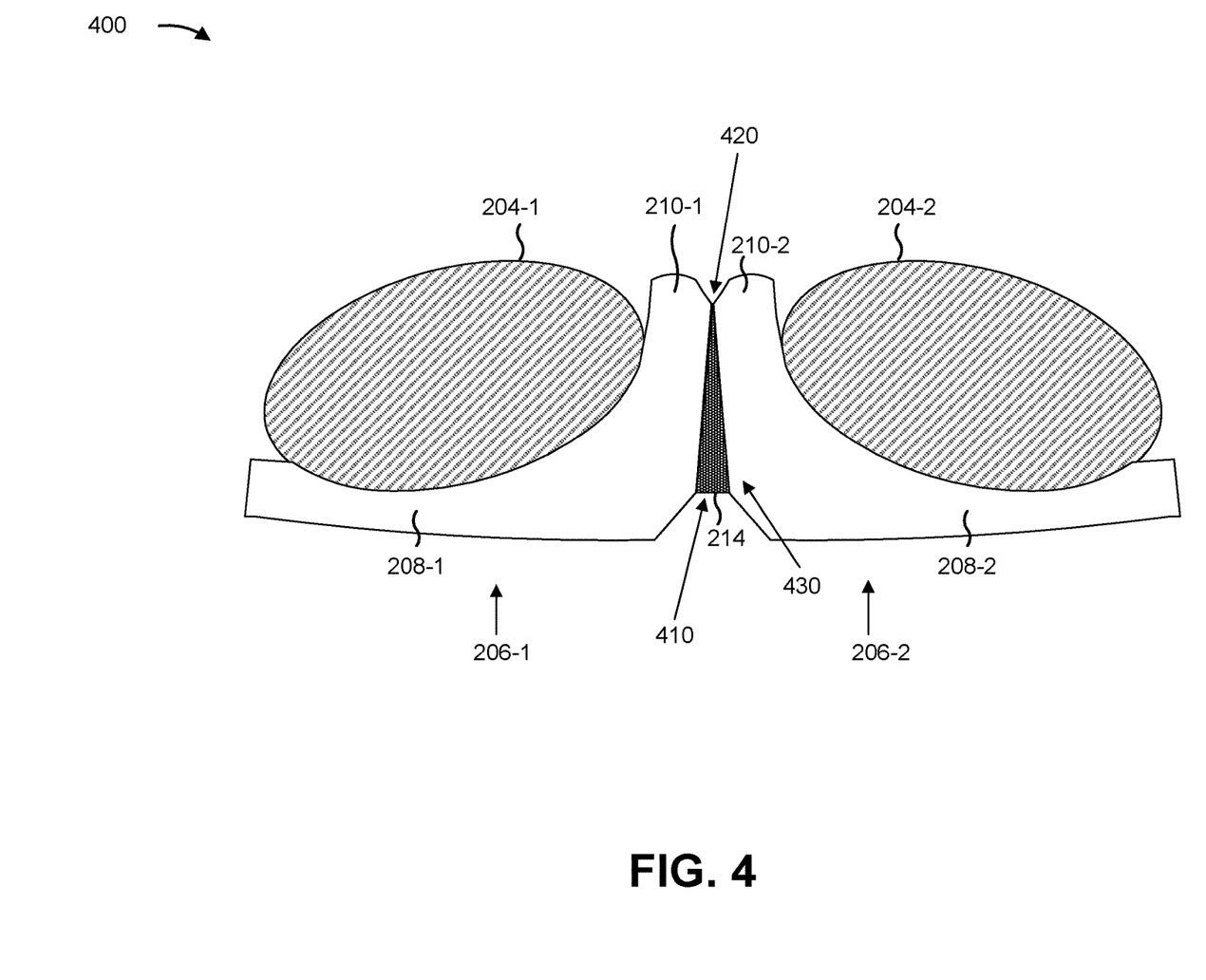
FIGS. 4-6 are cross-sectional diagrams of differently configured plates between ring assemblies of a ring seal system that may be used with the machine of FIG. 1.
Figure 5:
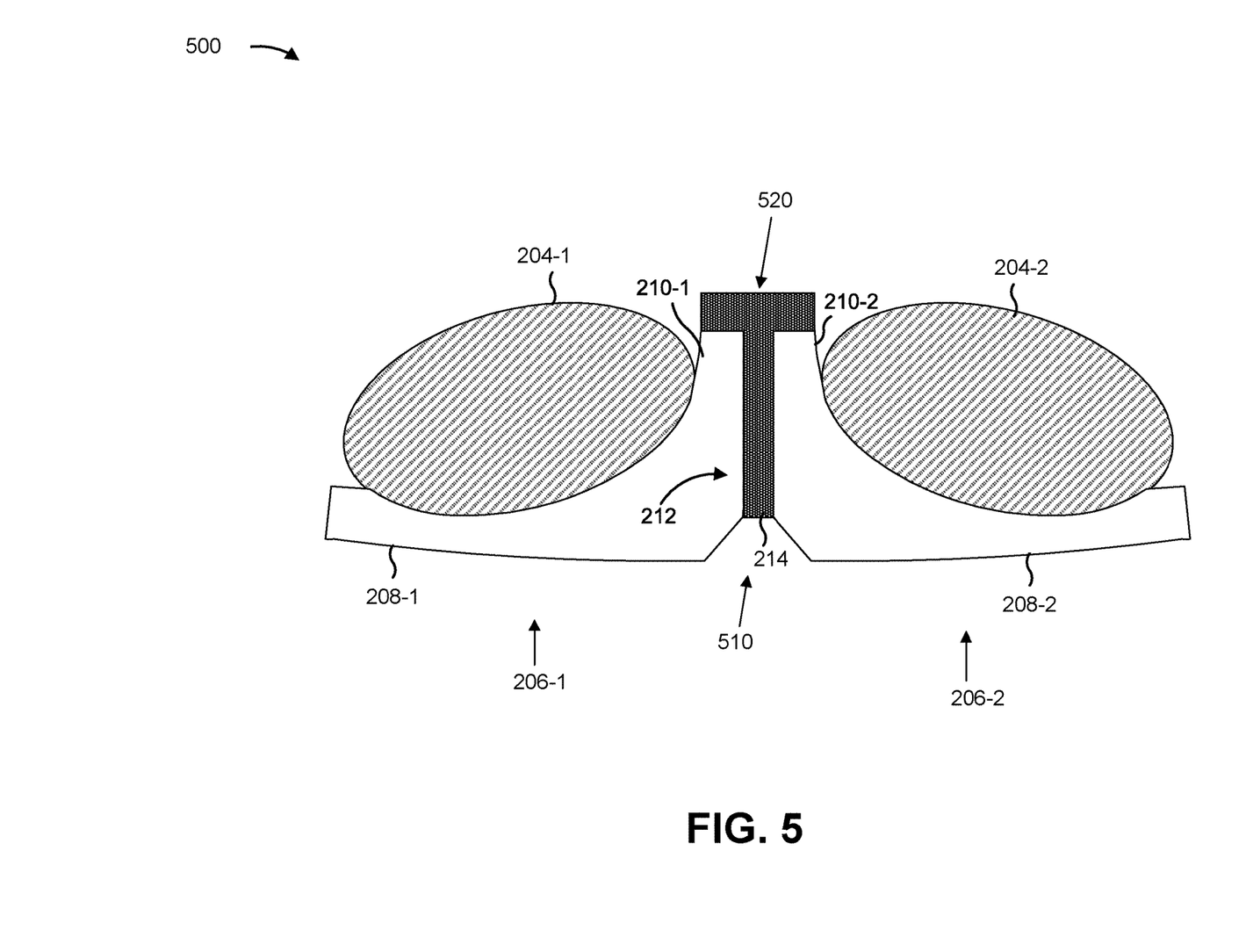
Figure 6:
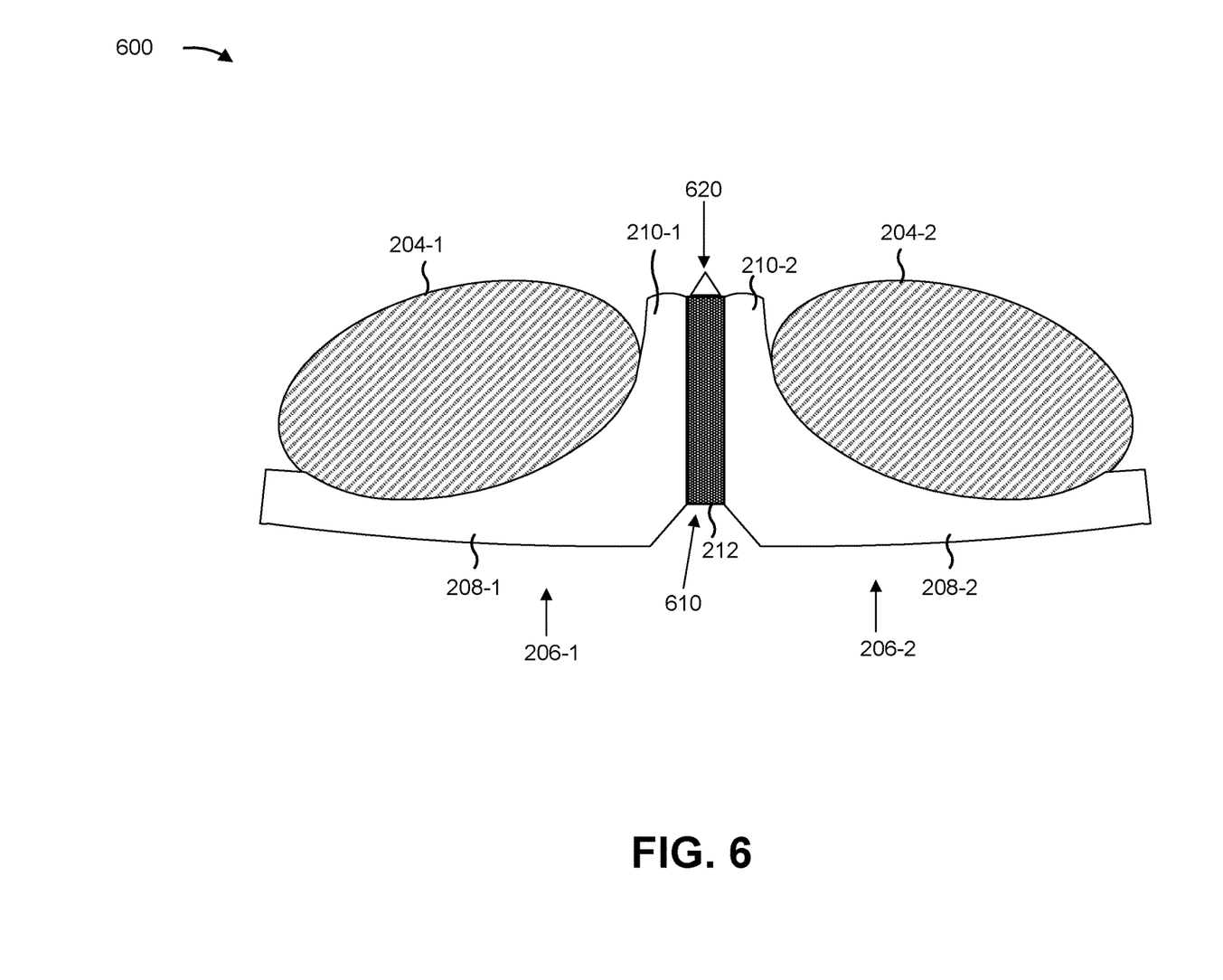

FIGS. 4-6 are cross-sectional diagrams 400-600 of differently configured plates between ring assemblies of a ring seal system that may be used with the machine of FIG. 1.

As shown in FIG. 4, and by reference number 410, plate 214 may have a triangular cross-section. In some implementations, and as shown by reference number 420, the triangular cross-section may have an exterior edge (e.g., an annular surface in the case of an annular shaped plate 214) that is narrower than an interior edge of plate 214 (shown by reference number 430). This may facilitate contact between respective first portions of the respective sealing surfaces of ring assemblies 206 (associated with the exterior edge) while substantially preventing contact between respective second portions of the respective sealing surfaces of ring assemblies 206 (associated with the interior edge). This may improve a seal formed by ring assemblies 206 by facilitating contact between the respective first portions of the respective sealing surfaces while reducing wear, friction, and/or heat experienced by the respective second portions of the respective sealing surfaces.

Turning to FIG. 5, and as shown by reference number 510, plate 214 may have a T-shaped cross-section. In some implementations, the T-shaped cross-section may substantially prevent respective sealing surfaces of the ring assemblies 206 from mechanically contacting each other. In some implementations, and as shown by reference number 520, the T-shaped cross-section may completely cover seal ring interface 212, thereby providing seal ring interface 212 with protection from dirt and/or other material.

Turning to FIG. 6, and as shown by reference number 610, plate 214 may have a rectangular cross-section. In some implementations, and as further shown by reference number 610, plate 214 may substantially prevent ring assemblies 206 from mechanically contacting each other, in a manner similar to that described elsewhere herein. As shown by reference number 620, plate 214 may further comprise a set of debris expulsion components mechanically connected to plate 214. In some implementations, a debris expulsion component may be a plate of metal, ceramic, carbon alloy, and/or the like affixed to an exterior edge of plate 214. Alternatively, a debris expulsion component may be an annular shaped component affixed to the exterior edge of plate 214. In some implementations, the debris expulsion component may expel material from between seal ring housings 202, during operation of machine 102 (e.g., as the debris expulsion component rotates with plate 214). This reduces or eliminates an amount of material that could interfere with seal ring interface 212 and/or that could move within a chamber formed by a set of plate bores 216 of plate 214 and/or respective sets of ring bores 218 of ring assemblies 206.

As indicated above, FIGS. 4-6 are provided as examples. Other examples may differ from what was described in connection with FIGS. 4-6.

Figure 7:
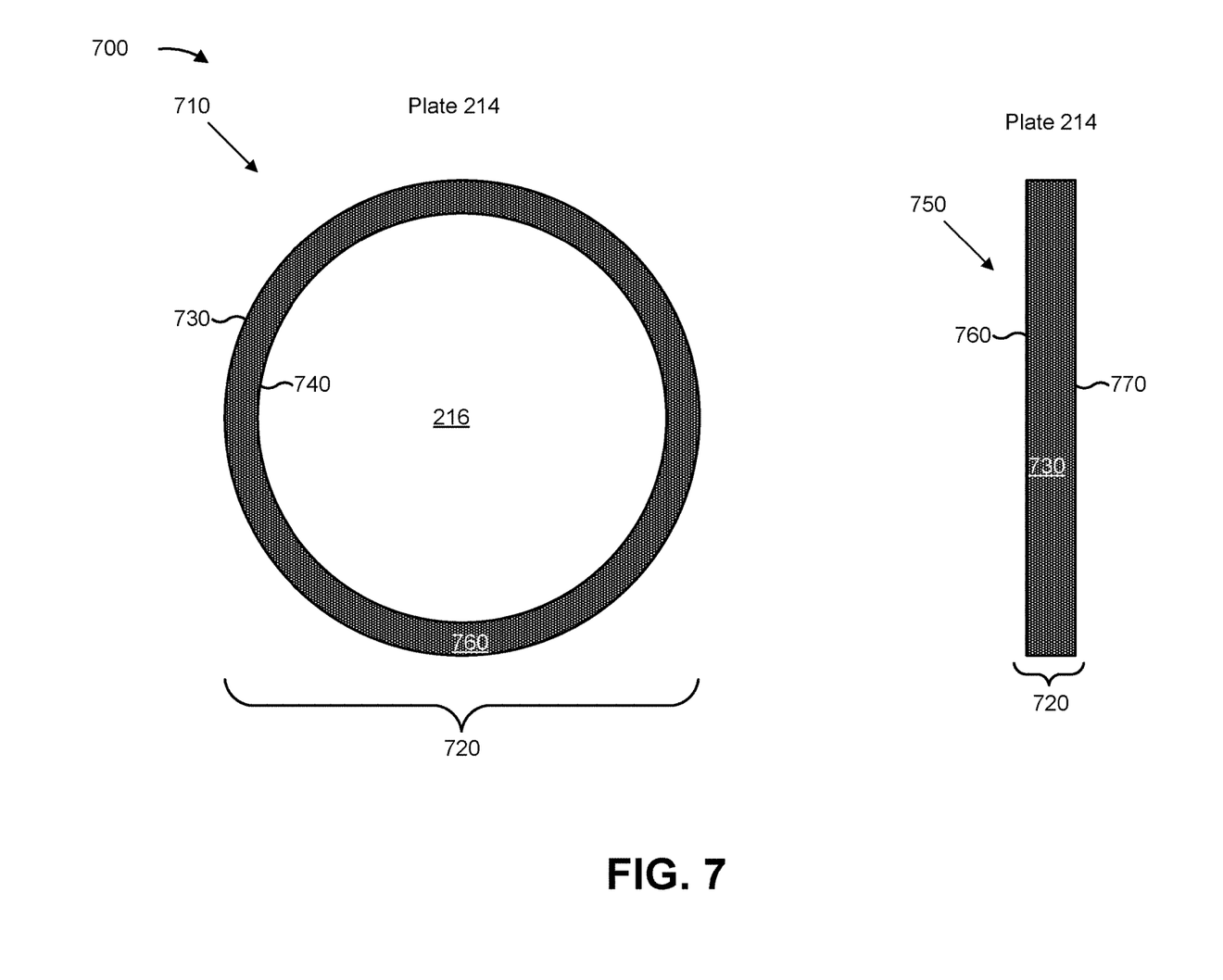
FIG. 7 is a diagram of various views of a plate, described herein, that may be used with the machine of FIG. 1.

FIG. 7 is a diagram 700 of various views of a plate, described herein, that may be used with the machine of FIG. 1.

Reference number 710 shows a front view of plate 214. As shown, plate 214 includes a plate of material 720. For example, plate of material 720 may be a plate of metal, ceramic, carbon alloy, and/or the like similar to that described elsewhere herein. Although plate of material 720 is shown as having an annular shape, other shapes are possible for plate or material 720, as described elsewhere herein. As further shown with respect to plate of material 720, plate of material 720 may include an exterior edge 730. In some implementations, exterior edge 730 may be an annular edge of plate of material 720 when plate of material 720 has an annular shape. As further shown, plate of material 720 may include an interior edge 740. In some implementations, and as described elsewhere herein, interior edge 740 may define plate bore 216.

Reference number 750 shows a side view of plate of material 720. As shown, plate of material 720 may have a rectangular profile, with a rectangular cross-section, similar to that described elsewhere herein. In some implementations, plate of material 720 may have a different profile and/or cross-section, such as a hexagonal profile with a triangular cross-section, a rectangular profile with a T-shaped cross-section, and/or the like. As further shown, plate of material 720 includes a first contact surface 760 and a second contact surface 770, similar to that described elsewhere herein. For example, the first contact surface 760 and the second contact surface 770 may be adjacent to exterior edge 730. In some implementations, the first contact surface 760 and the second contact surface 770 may form respective seals with respective sealing surfaces of ring assemblies 206.

As indicated above, FIG. 7 is provided as an example. Other examples may differ from what was described in connection with FIG. 7.

Figure 8:
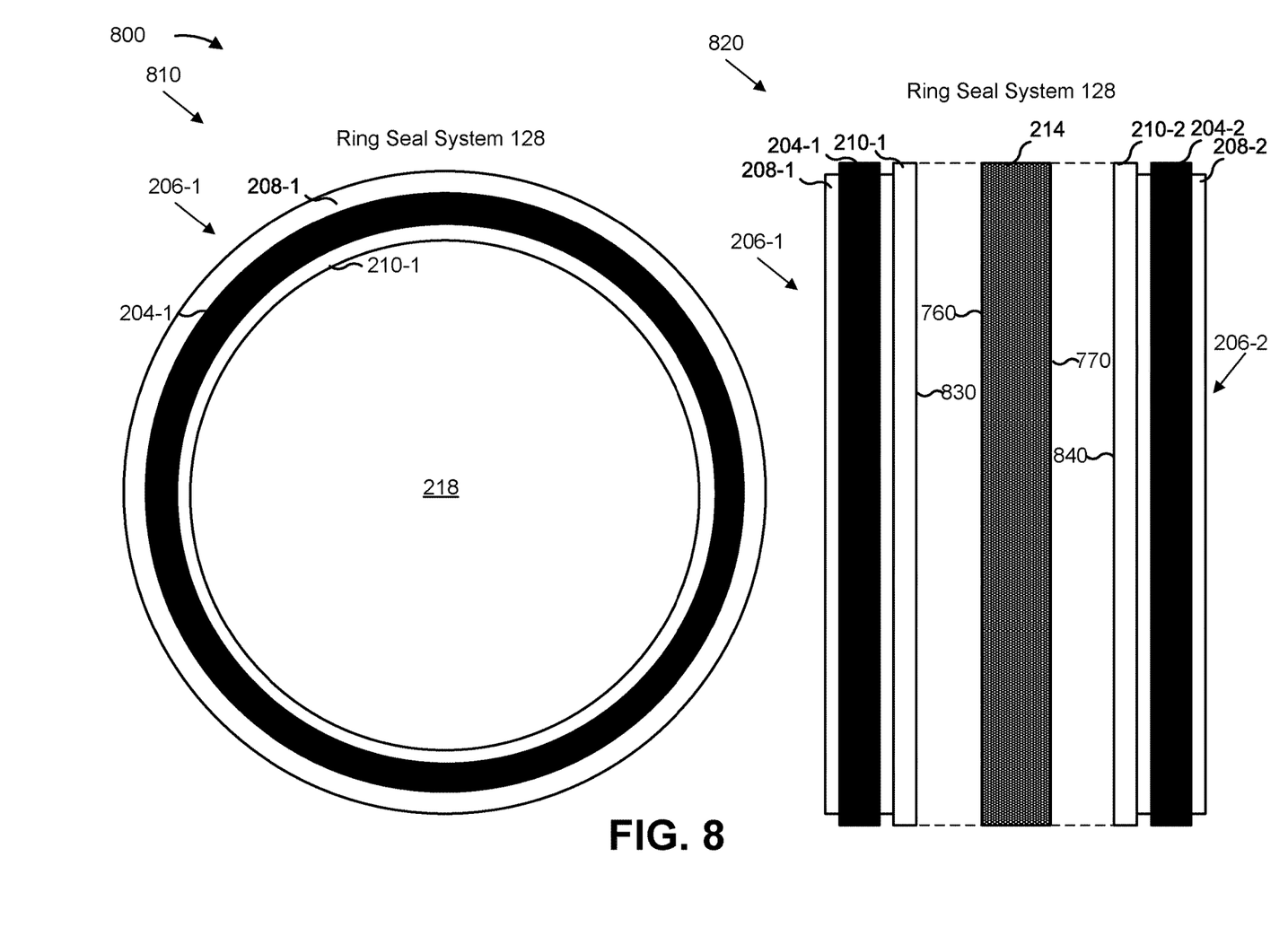
FIG. 8 is a diagram of various views of a ring seal system, described herein, that may be used with the machine of FIG. 1.

FIG. 8 is a diagram 800 of various views of a ring seal system, described herein, that may be used with the machine of FIG. 1.

Reference number 810 shows a side view of ring seal system 128. For example, the side view shows a single ring assembly 206 and a single toric 204 associated with the single ring assembly 206. Reference number 820 shows a side view of ring seal system 128. For example, the side view shows that ring seal system 128 includes multiple ring assemblies 206, with corresponding torics 204. As further shown, the multiple ring assemblies 206 may include respective sealing surfaces 830 and 840 (e.g., a first sealing surface 830 of second section 210-1 and a second sealing surface 840 of second section 210-2, respectively). For example, ring assembly 206-1 may include sealing surface 830 and ring assembly 206-2 may include sealing surface 840. In some implementations, sealing surface 830 may form a first seal with contact surface 760 when plate 214 is installed in ring seal system 128, and sealing surface 840 may form a second seal with the second contact surface 770 when plate 214 is installed in ring seal system 128.

As indicated above, FIG. 8 is provided as an example. Other examples may differ from what was described in connection with FIG. 8.

Figure 9:
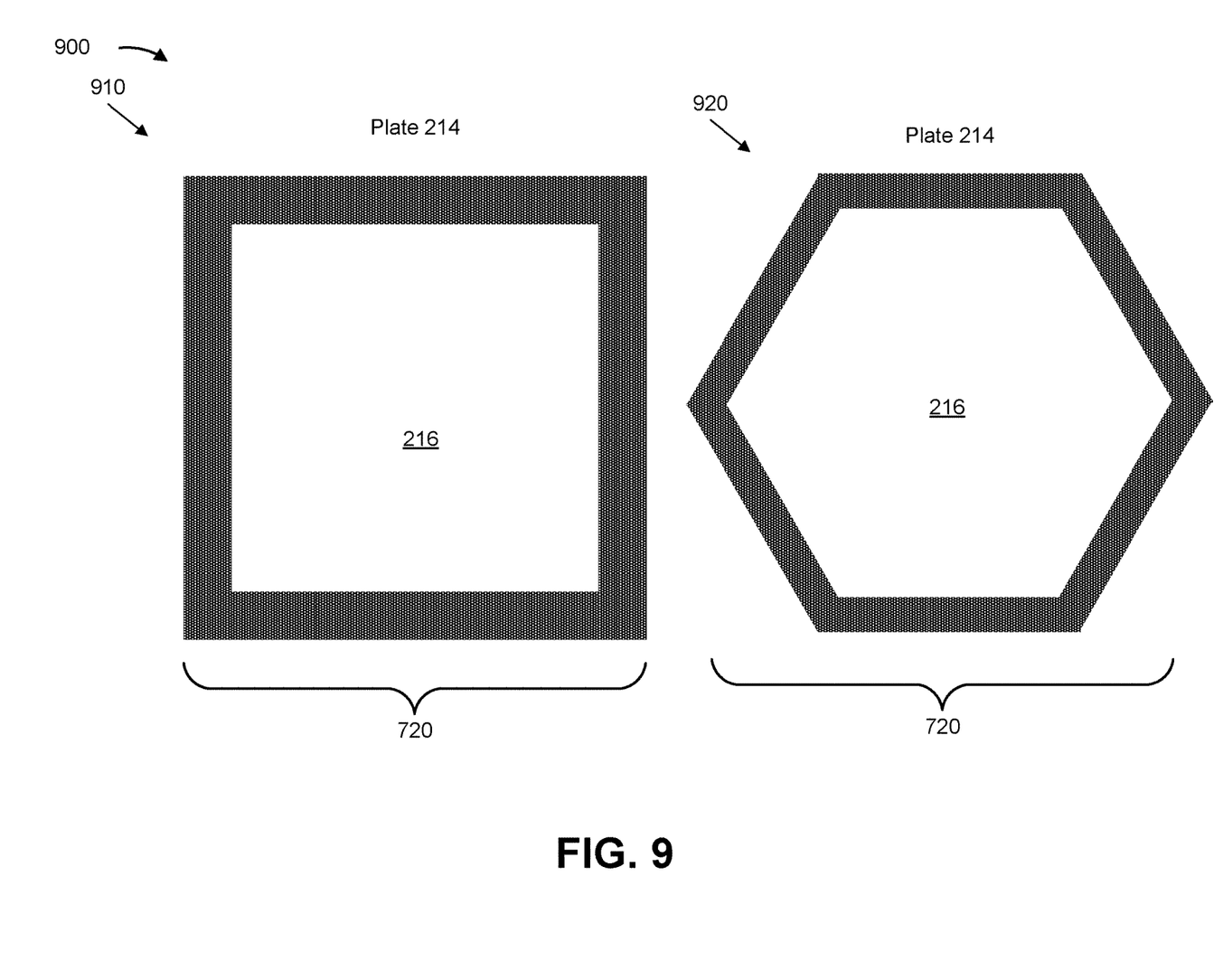
FIGS. 9-10 are diagrams of various configurations of a plate, described herein, that may be used with the machine of FIG. 1.
Figure 10:
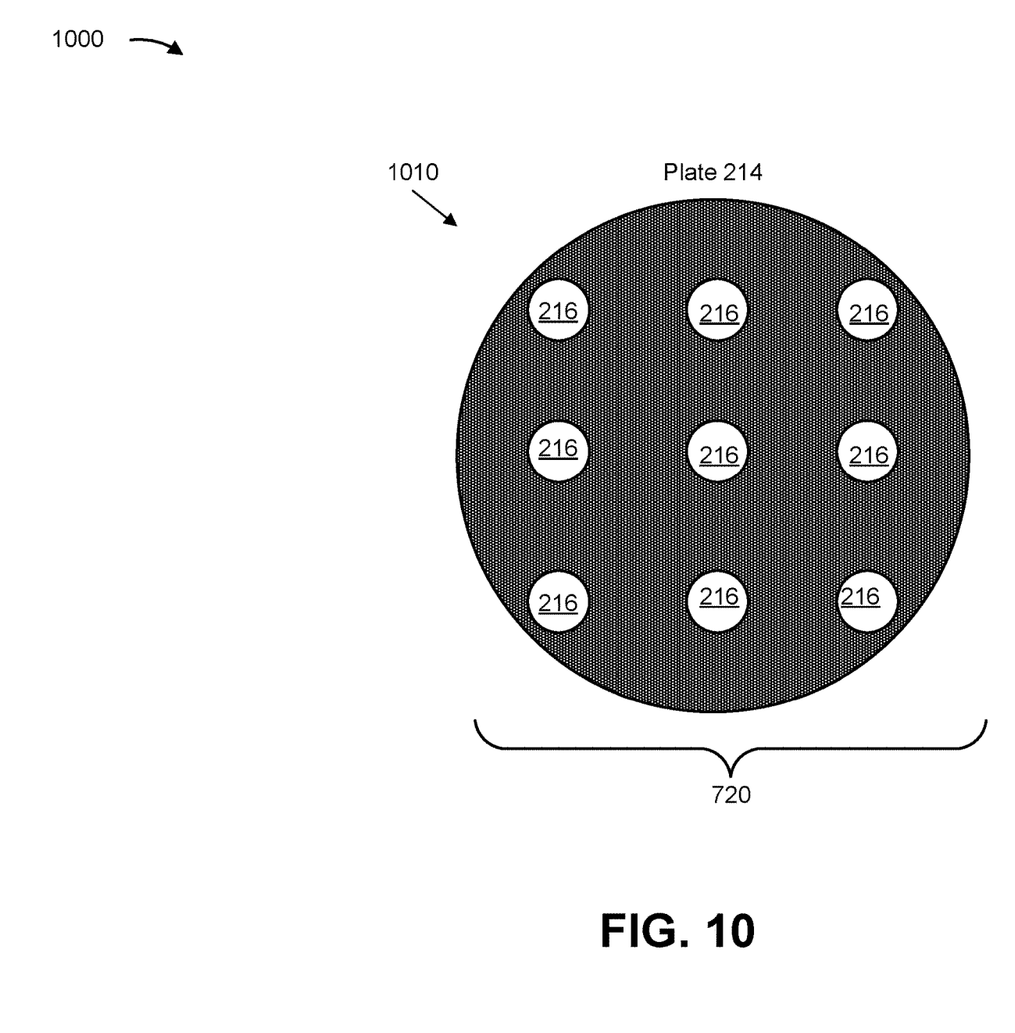

FIGS. 9-10 are diagrams 900-1000 of various configurations of a plate, described herein, that may be used with the machine of FIG. 1.

As shown in FIG. 9, and by reference number 910, plate of material 720 of plate 214 may have a rectangular shape. In some implementations, an interior edge of plate of material 720 may define a rectangular shaped plate bore 216. As shown by reference number 920, plate of material 720 of plate 214 may have a hexagonal shape. In some implementations, an interior edge of plate 214 may define a hexagonal shaped plate bore 216.

Turning to FIG. 10, and as shown by reference number 1010, plate of material 720 may include multiple plate bores 216, rather than a single plate bore 216 as described elsewhere herein. In some implementations, ring assemblies 206 to be associated with plate 214 may include a similar quantity, size, arrangement, and/or the like of plate bores 216. In some implementations, ring assemblies 206 to be associated with plate 214 may include a different quantity, size, arrangement, and/or the like of plate bores 216. Although a particular quantity, size, arrangement, and/or the like of plate bores 216 are shown in FIG. 10, other quantities, sizes, arrangements, and/or the like are possible and may differ from what is shown in FIG. 10.

As indicated above, FIGS. 9-10 are provided as examples. Other examples may differ from what was described in connection with FIGS. 9-10.

INDUSTRIAL APPLICABILITY

Ring seal system 128 may be used with any machine, such as a machine that includes rotating components (e.g., of crawler track 108). For example, ring seal system 128 may include multiple ring assemblies 206, with plate 214 between respective sealing surfaces of the multiple ring assemblies 206. Plate 214 may reduce friction and/or wear between the respective sealing surfaces, thereby reducing or eliminating a need for the multiple ring assemblies 206 to be replaced. In addition, plate 214 may absorb and/or dissipate heat generated by rotation of the multiple ring assemblies 206, thereby reducing wear on the multiple ring assemblies 206, increasing a life span of the multiple ring assemblies 206, and/or the like. Further, plate 214 may absorb mechanical stress from the weight of machine 102 that would otherwise be applied to the respective sealing surfaces, thereby reducing a probability of failure of the multiple ring assemblies 206, reducing wear to the multiple ring assemblies 206, and/or the like.

Further, plate 214 may be produced from a variety of materials and/or coatings, such as to control a hardness of plate 214, a coefficient of friction associated with plate 214, and/or the like. As such, plate 214 may be produced cheaply, such as by producing plate 214 from a softer, cheaper material, and applying a coating to plate 214 so that plate 214 has a hardness and/or coefficient of friction desired for a particular use. In addition, plate 214 may be configured, via selection of materials and/or coatings, to wear at a faster rate than the respective sealing surfaces of the multiple ring assemblies 206. This conserves costs that would otherwise be incurred replacing the multiple ring assemblies 206. In addition, replacing plate 214 may be easier and/or faster than replacing one or more of the multiple ring assemblies 206. This conserves time and resources that would otherwise be consumed replacing the one or more of the multiple ring assemblies 206.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A ring seal system, comprising:
   a first ring assembly that includes a first sealing surface;
   a second ring assembly that includes a second sealing surface;
   a plate, between the first ring assembly and the second ring assembly, that includes a first contact surface and a second contact surface,
   wherein the plate comprises:
      a metal,
      a ceramic, or
      a carbon alloy, and
   wherein the plate has at least one of:
      a triangular cross-section, or
      a T-shaped cross section, wherein the T-shaped cross section includes a first portion and a second portion, wherein the first portion is wider than the second portion, and wherein the first portion is above the first ring assembly and the second ring assembly; and a coating on the first contact surface and the second contact surface,
wherein the coating is to prevent wear between the first contact surface and the first sealing surface and between the second contact surface and the second sealing surface,
wherein the first contact surface is mechanically connected to the first sealing surface to form a first seal with the first sealing surface, and
wherein the second contact surface is mechanically connected to the second sealing surface to form a second seal with the second sealing surface.

2. The ring seal system of claim 1, wherein the plate is mechanically connected to the first ring assembly and the second ring assembly via friction and compression pressure between the first contact surface and the first sealing surface, and between the second contact surface and the second sealing surface.

3. The ring seal system of claim 1, further comprising:
a first toric associated with the first ring assembly; and
a second toric associated with the second ring assembly.

4. The ring seal system of claim 1, wherein the plate comprises a set of plate bores that match respective sets of ring bores associated with the first ring assembly and the second ring assembly.

5. The ring seal system of claim 1, wherein a first hardness of the first contact surface approximately matches a first hardness of the first sealing surface, and
wherein a second hardness of the second contact surface approximately matches a second hardness of the second sealing surface.

6. The ring seal system of claim 1, wherein a first coefficient of friction of the first contact surface approximately matches a first coefficient of friction of the first sealing surface, and
wherein a second coefficient of friction of the second contact surface approximately matches a second coefficient of friction of the second sealing surface.

7. A machine that includes a ring seal system, the ring seal system comprising:
a plurality of ring assemblies; and
a plate between the plurality of ring assemblies, comprising:
a plate of material with a first contact surface and a second contact surface adjacent to an exterior edge of the plate of material,
wherein the first contact surface and the second contact surface are aligned relative to each other based on an alignment of a first sealing surface of the plurality of ring assemblies, and a second sealing surface of the plurality of ring assemblies,
wherein the plate of material and the plurality of ring assemblies include different materials,
wherein a hardness of the first contact surface is within 10 percent of a hardness of the first sealing surface,
wherein a coefficient of friction of the first contact surface is within 10 percent of a coefficient of friction of the first sealing surface,
wherein a hardness of the second contact surface is within 10 percent of a hardness of the second sealing surface, and
wherein a coefficient of friction of the second contact surface is within 10 percent of a coefficient of friction of the second sealing surface.

8. The machine of claim 7, wherein the machine includes a crawler track that includes the ring seal system.

9. The machine of claim 7, wherein the plate comprises:
a first coating on the first contact surface, and
a second coating on the second contact surface,
wherein the first coating and the second coating are a same coating.

10. The machine of claim 7, wherein the plurality of ring assemblies is at least one of:
a plurality of metal-faced ring assemblies, or
a plurality of heavy duty dual faced (HDDF) seal rings.

11. The machine of claim 7, wherein the plate comprises a set of plate bores, and
wherein the set of plate bores is aligned with respective sets of ring bores included in the plurality of ring assemblies.

12. The machine of claim 7, wherein the plate prevents the first sealing surface and the second sealing surface from contacting each other.

13. A plate, comprising:
a plate of material with a first contact surface and a second contact surface adjacent to an exterior edge of the plate of material,
wherein the plate of material comprises a ceramic or a carbon alloy, and
wherein the plate has at least one of:
a triangular cross-section, or
a T-shaped cross section, wherein the T-shaped cross section includes a first portion and a second portion, wherein the first portion is wider than the second portion, and wherein the first portion is above the first ring assembly and the second ring assembly;
a first coating on the first contact surface to prevent wear to the first contact surface or to a first sealing surface of a ring seal system based on a first hardness of the first coating; and
a second coating on the second contact surface to prevent wear to the second contact surface or to a second sealing surface of the ring seal system based on a second hardness of the second coating,
wherein the first contact surface is to form a first seal with the first sealing surface, and
wherein the second contact surface is to form a second seal with the second sealing surface.

14. The plate of claim 13, wherein the first coating and the second coating comprise at least one of:
a high-velocity oxygen fuel (HVOF) coating,
a high-velocity air fuel (HVAF) coating,
an amorphous diamond-like carbon (ADLC) coating, or
a nitrogen-based coating.

15. The plate of claim 13, wherein the first hardness and the second hardness are at least a 40 on a Rockwell scale.

16. The plate of claim 13, wherein the plate of material has an annular shape, and
wherein the exterior edge is an annular surface of the annular shape of the plate of material.

17. The plate of claim 16, further comprising:
a plate bore defined by an interior surface of the annular shape of the plate of material.

18. The plate of claim 13, further comprising a debris expulsion component mechanically connected to the plate of material.

19. The plate of claim 13, wherein a hardness of the first contact surface is within 10 percent of a hardness of the first sealing surface.

20. The machine of claim 7, wherein the plate of material comprises a ceramic or a carbon alloy.

* * * * *